US010007866B2

(12) United States Patent
Criminisi et al.

(10) Patent No.: US 10,007,866 B2
(45) Date of Patent: Jun. 26, 2018

(54) NEURAL NETWORK IMAGE CLASSIFIER

(71) Applicant: Microsoft Technology Licensing, LLC, Redmond, WA (US)

(72) Inventors: Antonio Criminisi, Cambridge (GB); Aditya Vithal Nori, Cambridge (GB); Dimitrios Vytiniotis, Cambridge (GB); Osbert Bastani, Stanford, CA (US); Leonidas Lampropoulos, Athens (GR)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 15/141,759

(22) Filed: Apr. 28, 2016

(65) Prior Publication Data

US 2017/0316281 A1    Nov. 2, 2017

(51) Int. Cl.
*G06K 9/62* (2006.01)

(52) U.S. Cl.
CPC ......... *G06K 9/6257* (2013.01); *G06K 9/6276* (2013.01)

(58) Field of Classification Search
CPC .......... G06F 17/30047; G06K 9/00369; G06T 7/001; H04N 5/23241
See application file for complete search history.

(56) References Cited

U.S. PATENT DOCUMENTS

| 7,461,038 | B2 * | 12/2008 | Kropaczek | G05B 13/024 |
| | | | | 703/13 |
| 7,685,079 | B2 | 3/2010 | Watford et al. | |
| 8,345,962 | B2 * | 1/2013 | Yu | G06N 3/08 |
| | | | | 382/156 |
| 2005/0129306 | A1 * | 6/2005 | Wang | G06T 3/403 |
| | | | | 382/156 |
| 2013/0321872 | A1 * | 12/2013 | Shimada | H04N 1/6097 |
| | | | | 358/3.23 |

(Continued)

FOREIGN PATENT DOCUMENTS

| WO | WO 2014205231 A1 * | 12/2014 | ............... G06K 9/62 |
| WO | WO2014205231 A1 | 12/2014 | |

OTHER PUBLICATIONS

Szegedy, et al. 2014. Intriguing properties of neural networks. Computer Vision and Pattern Recogntion. Neural and Evolutionary Computing.*

(Continued)

*Primary Examiner* — Iman K Kholdebarin
*Assistant Examiner* — Mai Tran
(74) *Attorney, Agent, or Firm* — Drinker Biddle & Reath LLP (57) ABSTRACT

A training engine is described which has a memory arranged to access a neural network image classifier, the neural network image classifier having been trained using a plurality of training images from an input space, the training images being labeled for a plurality of classes. The training engine has an adversarial example generator which computes a plurality of adversarial images by, for each adversarial image, searching a region in the input space around one of the training images, the region being one in which the neural network is linear, to find an image which is incorrectly classified into the plurality of classes by the neural network. The training engine has a processor which further trains the neural network image classifier using at least the adversarial images.

20 Claims, 8 Drawing Sheets

(56) References Cited

U.S. PATENT DOCUMENTS

2014/0074762 A1* 3/2014 Campbell ............. G06Q 40/00
706/46
2017/0278135 A1* 9/2017 Majumdar ......... G06Q 30/0256

OTHER PUBLICATIONS

Szegedy, Feb. 2014. Intriguing Properties of Neural Networks. arXiv:1312.6199 [cs.CV]. Computer Vision and Pattern Recognition (cs. CV); Learning (cs. LG); Neural and Evolutionary Computing (cs. NE).*
I. N. da Silva, L. V. R. de Arruda and W. C. do Amaral, "Application of the Hopfield network in robust estimation of parametric membership sets for linear models," 1995 IEEE International Conference on Systems, Man and Cybernetics. Intelligent Systems for the 21st Century, Vancouver, BC, 1995, pp. 3949-3953 vol. 5.*
Bachman et al., "Learning with Pseudo-Ensembles," In Proceedings of Twenty-eighth Annual Conference on Neural Information Processing Systems, Dec. 8, 2014, pp. 1-9.
Caramanis et al., "Robust Optimization in Machine Learning," In Publication of MIT Press, Apr. 9, 2011, 35 pages.
Chalupka et al., "Visual causal feature learning," In Proceedings of the Thirty-First Conference on Uncertainty in Artificial Intelligence, Jul. 12, 2015, 15 pages.
Dalvi et al., "Adversarial Classification", In Proceedings of the Tenth ACM SIGKDD International Conference on Knowledge Discovery and Data Mining, Aug. 22, 2004, 10 pages.
Doi et al., "A Theoretical Analysis of Robust Coding over Noisy Overcomplete Channels," In Proceedings of Twentieth Annual Conference on Neural Information Processing Systems, Dec. 4, 2006, pp. 1-8.
Fawzi et al., "Analysis of Classifiers' Robustness to Adversarial Perturbations," In Journal of Computing Research Repository, Feb. 2015, pp. 1-23.
Goodfellow et al., "Explaining and harnessing adversarial examples," In Proceedings of International Conference on Learning Representations, May 9, 2015, pp. 1-11.
Gu et al., "Towards Deep Neural Network Architectures Robust to Adversarial Examples," In Journal of Computing Research Repository, Dec. 2014, pp. 1-9.
Huang et al., "Learning with a Strong Adversary," In Journal of Computing Research Repository, Nov. 2015, pp. 1-12.
Jia et al., "Caffe: Convolutional Architecture for Fast Feature Embedding," In Journal of Computing Research Repository, Aug. 2014, 4 pages.
Kantchelian et al., "Evasion and Hardening of Tree Ensemble Classifiers," In Journal of the Computing Research Repository, Sep. 2015, pp. 1-9.
Ko et al., "Audio Augmentation for Speech Recognition," In Proceedings of 16th Annual Conference of International Speech Communication Association, Sep. 6, 2015, 5 pages.
Lecun et al., "Gradient-based learning applied to document recognition," In Proceedings of the IEEE, vol. 86, Issue 11, Nov. 1998, pp. 1-46.
Li et al., "Improving Robustness of Deep Neural Networks Via Spectral Masking for Automatic Speech Recognition," In Proceedings of IEEE Workshop on Automatic Speech Recognition and Understanding, Dec. 8, 2013, 6 pages.
Lin et al., "Network in Network," In Journal of Computing Research Repository, Dec. 2013, pp. 1-10.
Lo et al., "Understanding Deep Networks with Gradients," In Proceedings of IEEE 15th International Conference on Data Mining Workshops, Nov. 14, 2015, pp. 1548-1556.
Martin-Gonzalez, "International Computing Systems," In Publication of Springer, Retrieved on: Mar. 9, 2016, 1 page.
Montufar et al., "On the number of linear regions of deep neural networks," In Proceedings of Twenty-eighth Annual Conference on Neural Information Processing System, Dec. 8, 2014, pp. 1-17.
Moosavi-Dezfooli, "On the Robustness of Deep Networks for Images Classification," In EDIC Research Proposal, Jul. 13, 2015, pp. 1-7.
Narayanan et al., "Improving Robustness of Deep Neural Network Acoustic Models via Speech Separation and Joint Adaptive Training," In Proceedings of IEEE/ACM Transactions on Audio, Speech, and Language Processing, vol. 23, Issue 1, Jan. 2015, pp. 92-101.
Nguyen et al., "Deep neural networks are easily fooled: High confidence predictions for unrecognizable images," In Proceedings of IEEE Conference on Computer Vision and Pattern Recognition, Jun. 7, 2015, pp. 1-20.
Seltzer et al., "An Investigation of Deep Neural Networks for Noise Robust Speech Recognition," In Proceedings of IEEE International Conference on Acoustics, Speech and Signal Processing, May 26, 2013, pp. 7398-7402.
Szegedy et al., "Intriguing properties of neural networks," In Proceedings of the International Conference on Learning Representations, Apr. 15, 2014, pp. 1-9.
Tabacof et al., "Exploring the Space of Adversarial Images," In Journal of Computing Research Repository, Oct. 2015, pp. 1-10.
Weng et al., "Recurrent Deep Neural Networks for Robust Speech Recognition," In Proceedings of IEEE International Conference on Acoustic, Speech and Signal Processing, May 2014, pp. 5569-5573.

* cited by examiner

NEURAL NETWORK IMAGE CLASSIFIER

BACKGROUND

Image classification is an important task in many fields, such as image storing and retrieval, robotics, medical image analysis, closed circuit television security monitoring systems, satellite imaging analysis and others. Incoming images captured by image capture devices are to be classified automatically according to whether they depict particular types of object or show particular characteristics. A downstream system is then controlled using the classification results, for example, to trigger an alarm or to control a robotic vehicle.

A neural network is a collection of nodes interconnected by edges and where there are weights associated with the nodes and/or edges. During a training phase the weights are updated according to update rules in the light of training examples. In the case of image classification, input nodes receive image data and this propagates through the neural network, being transformed by internal nodes it passes through, to generate an output at one or more output nodes.

The embodiments described below are not limited to implementations which solve any or all of the disadvantages of neural network image classifiers.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A training engine is described which has a memory arranged to access a neural network image classifier, the neural network image classifier having been trained using a plurality of training images from an input space, the training images being labeled for a plurality of classes. The training engine has an adversarial example generator which computes a plurality of adversarial images by, for each adversarial image, searching a region in the input space around one of the training images, the region being one in which the neural network is linear, to find an image which is incorrectly classified into the plurality of classes by the neural network. The training engine has a processor which further trains the neural network image classifier using at least the adversarial images.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the example and the sequence of operations for constructing and operating the example. However, the same or equivalent functions and sequences may be accomplished by different examples.

Figure 3:
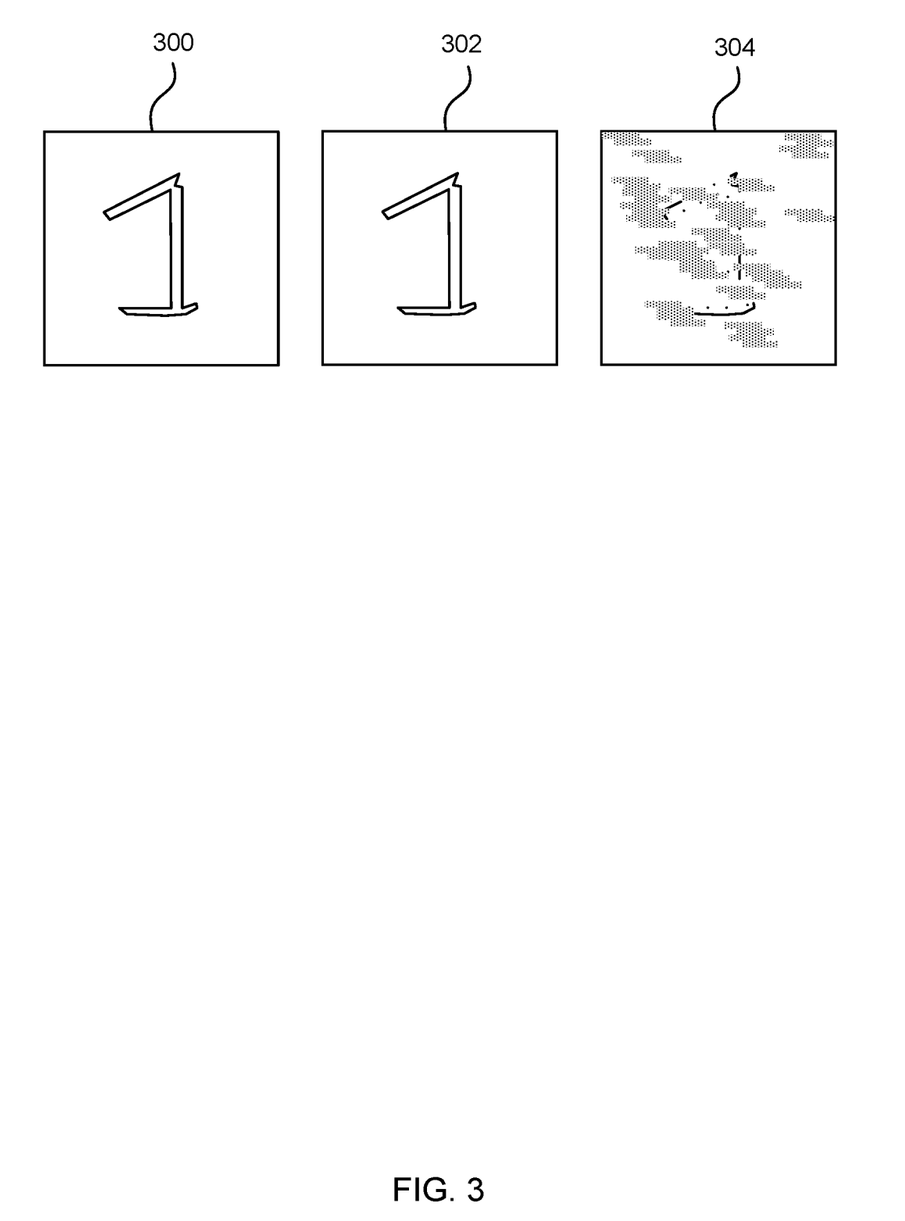
FIG. 3 is a schematic diagram of a training image, an adversarial image and a difference between the training image and the adversarial image.

Existing neural network image classifiers are typically not robust to adversarial images despite having good ability to generalize to images which are different from those used during training. An adversarial image is a small perturbation to a correctly classified image which "fools" the neural network, in that it is incorrectly classified by the neural network. For example, FIG. 3 shows an image 300 classified correctly as the integer 1 by a trained neural network. FIG. 3 shows an image 302 classified incorrectly as the integer 3 by the same trained neural network as used for classifying image 300. The image 302 is referred to as an adversarial example and is perceived by humans as the same as image 300.

There is a need to improve the robustness of neural network image classifiers to adversarial images. This improves security, reliability and accuracy of the neural network image classifier. However, this is a difficult problem, not least because it is hard to measure robustness of a neural network image classifier.

For example, suppose a neural network has been trained to classify body organs in a medical magnetic resonance imaging (MRI) image. If the neural network classifies the body organs differently, in images of the same patient taken on the same day but under different ambient conditions, the medical staff are unlikely to trust the classification results. By making the neural network more robust to adversarial images the neural network becomes reliable and trusted by end users. In another example, suppose a neural network has been trained to classify fingerprint images as being from an authorized person or not. An adversarial fingerprint image fools the neural network into classifying the fingerprint image as being from an authorized person. An adversary is less likely to be able to fool the neural network in this way when it has been made more robust as described herein.

Figure 1:
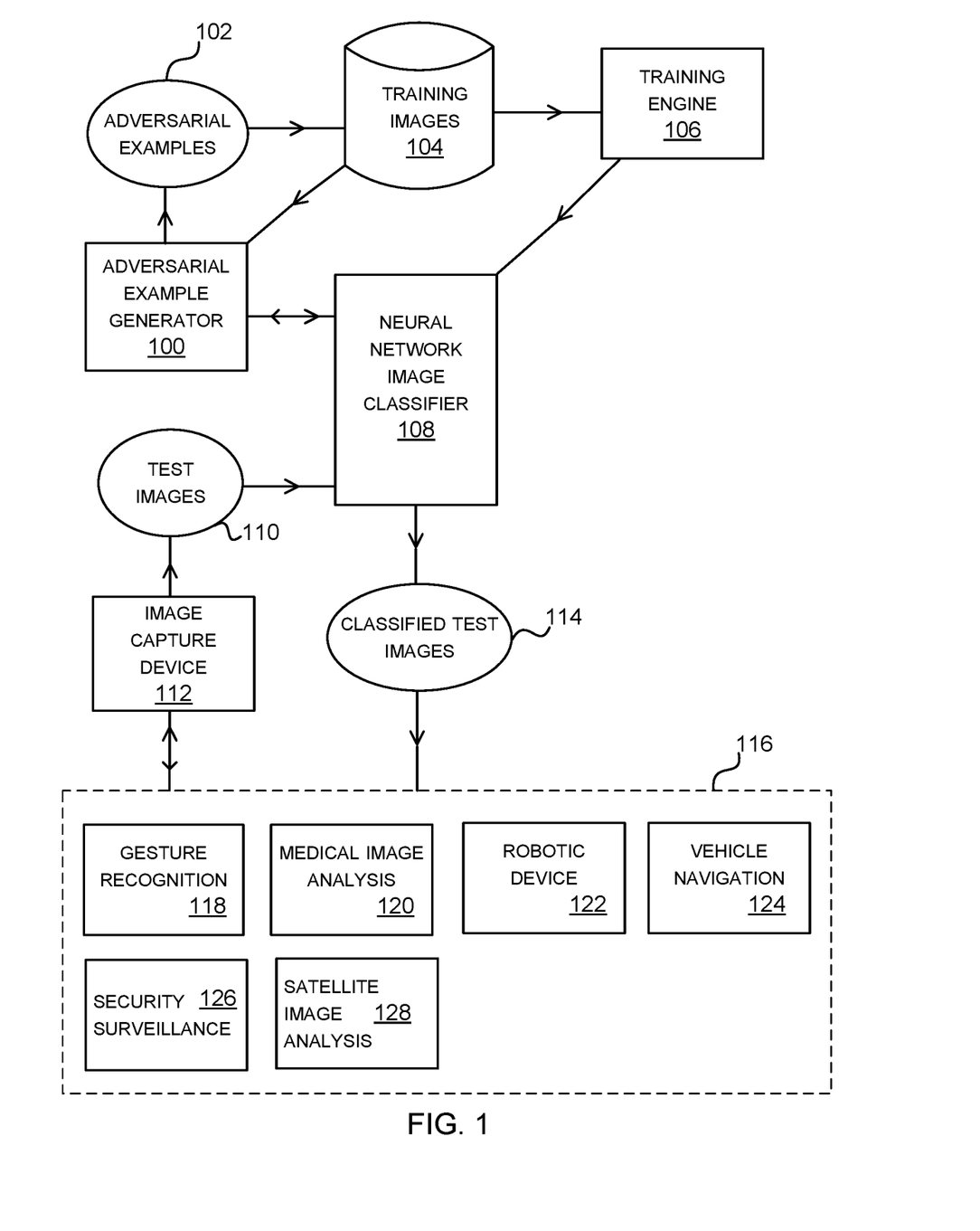
FIG. 1 is a schematic diagram of a training engine deployed with a neural network image classifier.

FIG. 1 is a schematic diagram of a training engine 106 deployed with a neural network image classifier 108. A neural network image classifier 108 is a neural network that classifies images into a plurality of classes as a result of being trained during a training phase. The training phase is typically done whilst the neural network is offline and the trained neural network is then used at test time, to classify images that have not previously been available to the neural network.

During training of the neural network image classifier 108, training images 104, which have correct class labels already known, are processed by the neural network and weights associated with nodes and/or edges of the neural network are updated using training functions. A training engine 106 is used to carry out training of the neural network image classifier 108. The training engine has access to the training images 104 and to training functions and training parameters.

At test time, test images 110 are processed by the neural network image classifier 108 to obtain classified test images 114. The test images 110 are captured by an image capture device 112 such as a camera, image sensor, medical imaging device, depth camera, video camera, web camera or other image capture device. The classified test images 114 are used by a target system 116 such as a gesture recognition system 118, a medical image analysis system 120, a robotic device 122, a vehicle navigation system 124, a security surveillance system 126, a satellite image analysis system 128 or others.

An adversarial example generator 100 has access to the neural network image classifier 108 and is able to retrieve training images 104 from a store of training images used to train the neural network image classifier 108. The adversarial example generator calculates an adversarial example 102 by searching a region in the input space around one of the training images, the region being one in which the neural network is linear, to find an image which is incorrectly classified into the plurality of classes by the neural network. The adversarial example generator is able to do this calculation for many or all of the training images 104 so that a plurality of adversarial examples 102 are calculated. The calculation is computable in parallel per adversarial example The input space of the neural network image classifier is the space of possible images which are potentially to be input to the neural network image classifier. The knowledge about this space includes the training images 104 which are already available, for example as images which have been labeled by human judges or as images which are been labeled by an automated or semi-automated manner known to be correct. The input space is multi-dimensional and so it is difficult/intractable to search in this space in practical time scales due to the complexity involved.

It is recognized herein that by constraining the search within the input space to regions around training examples in which the neural network is linear, it is possible to find adversarial examples in a practical manner. A neural network is said to be linear when the response it gives to an input is described well using a linear relationship. By constraining the search to regions around training examples in which the neural network is linear it is also possible to obtain more adversarial examples than previously possible.

Once the adversarial examples 102 are available these are used to fine tune the neural network image classifier 108 by retraining the neural network image classifier using the adversarial examples 102 and optionally some or all of the training images 104. In this way the neural network image classifier becomes robust to the adversarial examples 102. It is also found that the robust neural network image classifier is able to generalize well to other adversarial examples with which it has not been trained. In this way a more accurate, more secure neural network image classifier is obtained.

The process of generating the adversarial examples and fine-tuning is repeated in some cases until measurement of robustness of the neural network image classifier gives a result which changes little. The measurement of robustness of the neural network is based on a distance (in the linear regions) of the adversarial examples from the training images.

Figure 2:
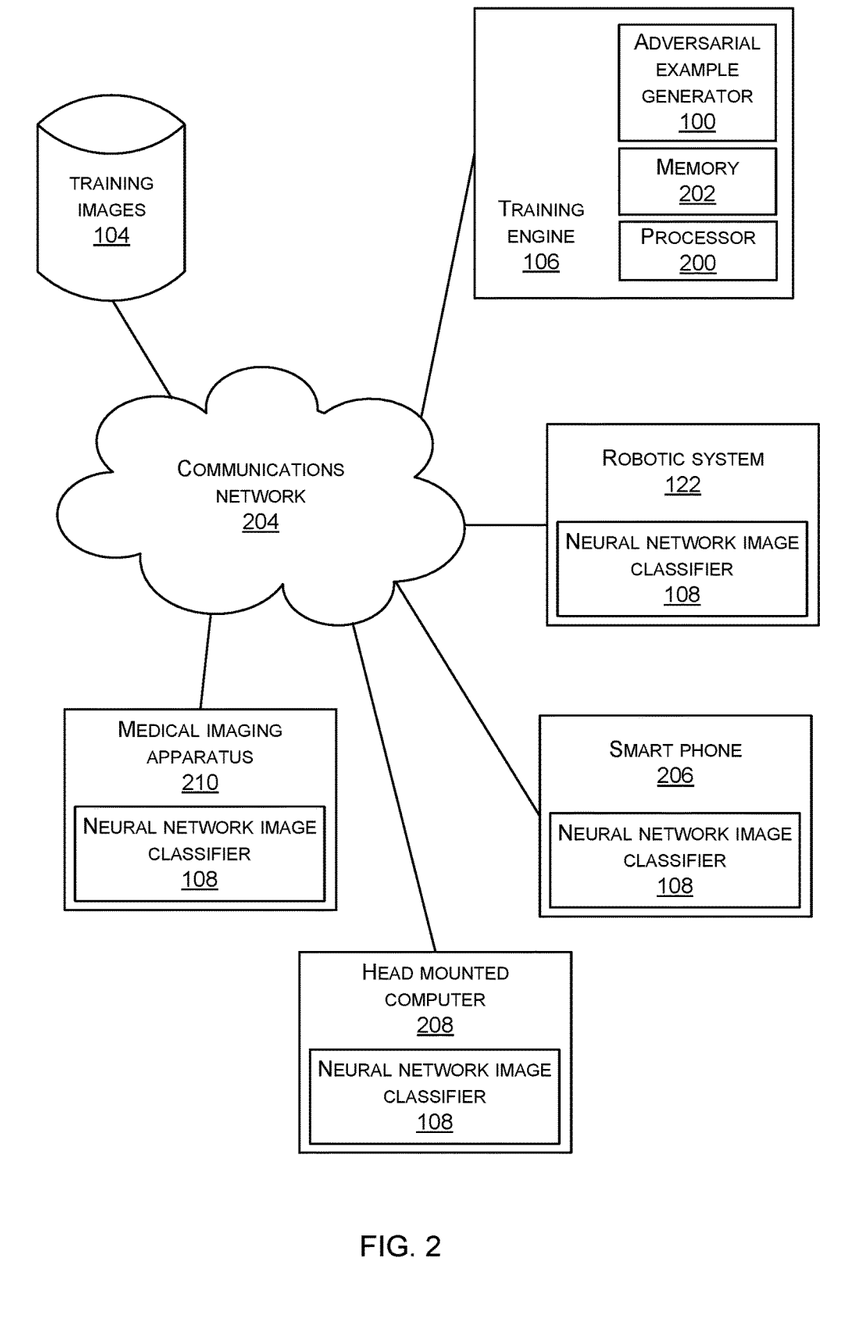
FIG. 2 is a schematic diagram of a training engine connected to a communications network.

In some examples, the neural network, once it has been made robust by training engine 106, is deployed in computing devices such as a robotic system 122, a smart phone 206, a head mounted computer 208, a medical imaging apparatus 210 and others as indicated in FIG. 2. The robust neural network is integral with the computing device 122, 206, 208, 210 and is implemented using a field-programmable gate array or other hardware logic component in some cases. In some examples, the functionality of the robust neural network image classifier 108 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs). In other examples the robust neural network image classifier 108 is implemented using a central processing unit CPU.

The training engine 106 comprises the adversarial example generator 100 in some cases. The training engine 106 comprises a memory 202 and a processor 200. The training engine has access to a store of training images 104 over a communications network 204 such as a wired or wireless communications network. Once the training engine 106 has computed the robust neural network image classifier 108 it deploys the neural network image classifier 108 to the computing devices 210, 208, 122, 206 in some examples.

In some examples the training engine 106 is available as a service to product developers and others with neural network image classifiers to be made robust. In this case product developers are able to communicate with the training engine 106 over communications network 204, to specify the location of a neural network to be made robust, and to specify the location of training data and values of any user configurable parameters made available by the adversarial example generator 100. The training engine 106 proceeds to compute adversarial examples and to train the neural network, or a copy of the neural network. The training engine provides the results to the product developer, such as by making the robust neural network available for download or sending the neural network details to a specified location on the communications network 204.

As mentioned above, FIG. 3 shows a schematic diagram of a training image 300, an adversarial image 302 and a difference 304 between the training image and the adversarial image. As described above, humans perceive training image 300 and adversarial image 302 as depicting the number one whilst the neural network image classifier outputs class 1 for image 300 and class 3 for image 302. Image 304 depicts differences between image 300 and image 302 and these differences are features which potentially contribute to the classification results given by the neural network. It can be said that the neural network image classifier "sees" things in the images 300 and 302 which are not perceived by humans; or that the neural network classifies the images 300 and 302 differently as a result of differences 304 in features in the multidimensional input space which are present but which are ignored by humans.

Figure 4:
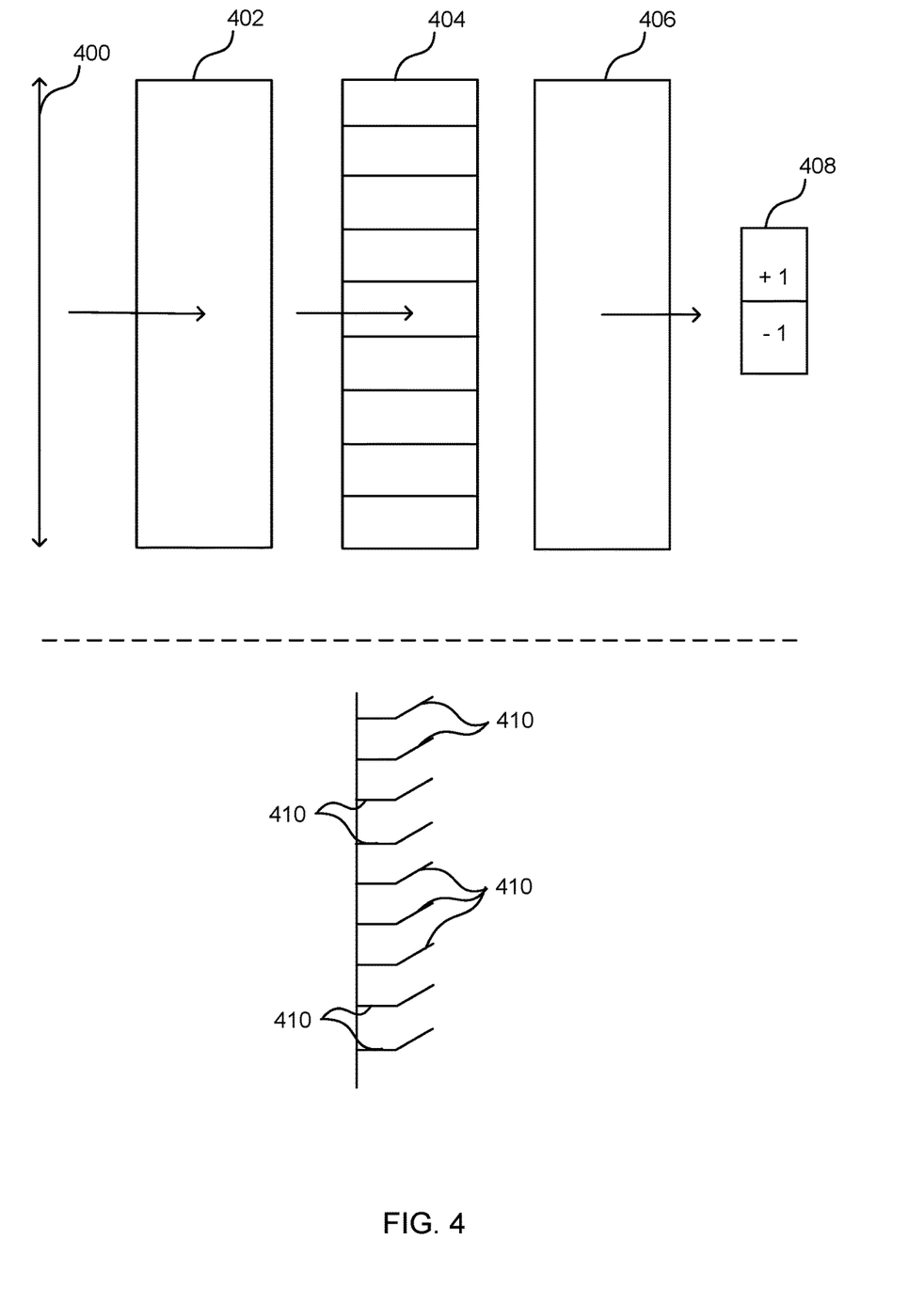
FIG. 4 is a schematic diagram of a neural network and a rectified linear unit representation of an internal layer of the neural network.

FIG. 4 is a schematic diagram of a neural network image classifier comprising three layers 402, 404, 406 and output nodes 408. In this example three layers are shown for ease of explanation although in practice there are typically more layers. The layers 402, 404, 406 are represented schematically as rectangles although each layer comprises a plurality of nodes, such as hundreds or thousands of nodes. An input image 400 is input to input nodes 402 of an input layer which are connected to internal layer 404. Internal layer comprises many nodes interconnected by edges. The internal layer 404 is connected to an output layer 406 comprising a plurality of nodes and the output layer 406 is connected to output nodes 408. In this example, the neural network image classifier acts to classify images into two classes indicated in FIG. 4 by +1 and −1. When image 400 is input to input nodes in input layer 402 it generates a response which is input to the internal layer 404 and which generates a response from the internal layer according to the arrangement of nodes and the weights and functions associated with the nodes. The response flows into the output layer 406 and in turn generates a response at the output nodes 408. According to the response at the output nodes 408 one of the two output nodes 408 is selected as indicating the class to be applied to the input image 400. Uncertainty data is associated with the class according to the values of the responses observed by the output nodes 408.

As mentioned above there is more than one internal layer 404 in some cases. Also, the types of the internal layers 404 are different in different examples according to the particular design of the neural network classifier. A non-exhaustive list of examples of types of layer is: fully-connected layer, rectified linear unit layer, convolutional layer, max-pooling layer. A fully-connected layer is one in which each node is connected to each other node. A rectified linear unit layer is one in which each node has an activation function defined as $f(x)=\max(0,x)$ where x is the input to the node. An activation function of a node defines the output of that node given an input or set of inputs. A convolutional layer is one which receives inputs from groups of nodes in the layer below. A max-pooling layer is one which partitions the image into a plurality of non-overlapping rectangles and, for each such sub-region, outputs the maximum.

In the example in FIG. 4 the internal layer is a rectified linear unit layer and the responses of the rectified linear units are represented as lines 410 in the lower part of FIG. 4.

Figure 5:
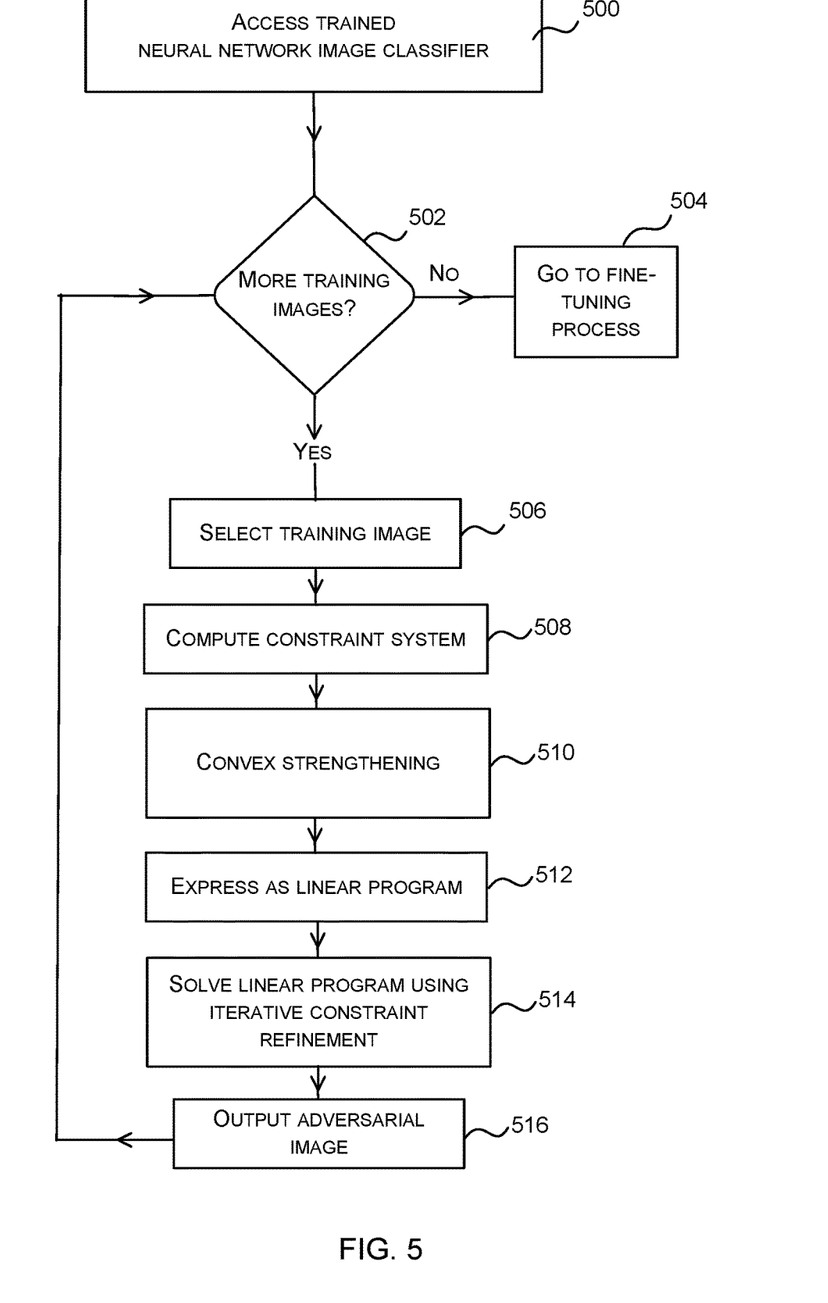
FIG. 5 is a flow diagram of an example method at an adversarial example generator.

FIG. 5 is a flow diagram of a method of operation at an adversarial example generator. A trained neural network image classifier is accessed 500. For example, from a location specified by a product developer. The neural network image classifier has been trained using labeled images in a set of training data, where the labels specify one of a plurality of classes into which the neural network classifies images. The individual training images are points in an input space which is a multi-dimensional space of potential images that may be classified by the neural network.

The adversarial example generator checks 502 if there are any training images in the training set which it has not yet used to generate adversarial examples. If not, it proceeds to a fine-tuning process as indicated by box 504. The fine-tuning process uses adversarial examples to further train the neural network image classifier as described with reference to FIG. 7 below.

If there is a training image which has not yet been used to generate adversarial examples, the training image is selected 506. The adversarial example generator computes 508 a constraint system which represents knowledge about the input space of the neural network, around the selected training point using information about the number and type of layers in the neural network. For example, the adversarial example generator observes the number and type of layers by inspecting the neural network. More detail about how the constrain system is computed for a variety of different types of neural network layer is given later in this document.

A constraint system is a plurality of equality statements and inequality statements expressing conditions which apply to the input space of the neural network. A constraint system typically has conjunctions (and statements) and disjunctions (or statements) combining at least some of the inequality statements. The adversarial example generator adds one or more constrains to the constraint system which ask for a point in the input space, in a small region around the selected training point, which is classified in a different way from the selected training point. Solutions to the constraint system then provide adversarial examples. However, it is very difficult and impractical to compute solutions to the constraint system. This is because the constraint system comprises disjunctions and so the feasible set is not convex. The feasible set is the set of images which satisfy the constraints in the constraint system. Searching a non-convex set of possibilities is known to be very difficult.

It has unexpectedly been found that it is possible to make an approximation of the constraint system, where the feasible set is convex, and from which adversarial examples are successfully computed. To make the approximation, the adversarial example generator carries out convex strengthening 510 of the constraint system in order to make the feasible set convex. This is done by eliminating disjunctions by determining a pair of disjuncts which form the disjunction and replacing the disjunction by one of the pair of disjuncts. In the case of some types of neural network layer (such as convolutional, or fully-connected layers) the resulting constraint system contains only conjunctions of linear relations and so its feasible set is convex and is expressible as a linear program. In the case of rectified linear unit layers or max-pooling layers there are still some disjunctions left in the constraint system.

To avoid the disjunctions in the constraint system in the case of rectified linear unit layers or max-pooling layers, the neural network is evaluated on the training image (denoted by the symbol $x_*$) and the input $f^i = x_*^{i-1}$ (i.e. the output of the immediately preceding layer) to the rectified linear unit layer (or max-pooling layer) is observed. The selected training image is applied 512 as input to the trained neural network as described above with reference to FIG. 4. The training image causes responses at input nodes of internal layers of the neural network and these responses are observed. A constraint system for the rectified linear unit layer (or max-pooling layer) is then constructed as follows:

$$x_j^{(i-1)} \leq 0 \wedge x_j^{(i)} = x_j^{(i-1)} \text{ if}(x_*^{(i-1)})_j \leq 0$$

$$x_j^{(i-1)} \geq 0 \wedge x_j^{(i)} = 0 \text{ if}(x_*^{(i-1)})_j > 0$$

Which is expressed in words as the jth element of the adversarial vector generated output of the immediately previous layer of the neural network is less than or equal to zero, and the jth element of the adversarial vector generated input of the current layer equals the jth element of the adversarial vector generated vector output of the immediately previous layer, if the jth element of the training image response output by the immediately previous layer is less than or equal to zero. The jth element of the adversarial vector generated output of the immediately previous layer of the neural network is greater than or equal to zero, and the jth element of the adversarial vector generated input of the current layer equals zero, if the jth element of the training image response output by the immediately previous layer is greater than to zero.

Once the constraint system has undergone convex strengthening so that the feasible set is convex, the constraint system is expressible as a linear program. The linear program is solved 514 by the adversarial example generator to compute at least one adversarial example, such as the adversarial example which is closest to the given training image in the linear region of the input space.

However, the constraint system comprises several hundreds of thousands of constraints and commercially available linear program solvers take a long time (minutes) to compute a solution in this situation. Therefore, in some examples, an iterative constraint refinement process is used. It is unexpectedly found that the iterative constraint refinement process is extremely successful and is able to compute a solution within two to three iterations in many cases such that a solution is available in seconds. By using parallelization, adversarial examples are computed from many different training examples in parallel in some examples.

Once the linear program has been solved an adversarial image is output 516 and is displayed to a user in some cases (although this is not essential). For example, so the user is able to visually compare the selected training image and the adversarial image and check they are visually perceived as the same.

Figure 6:
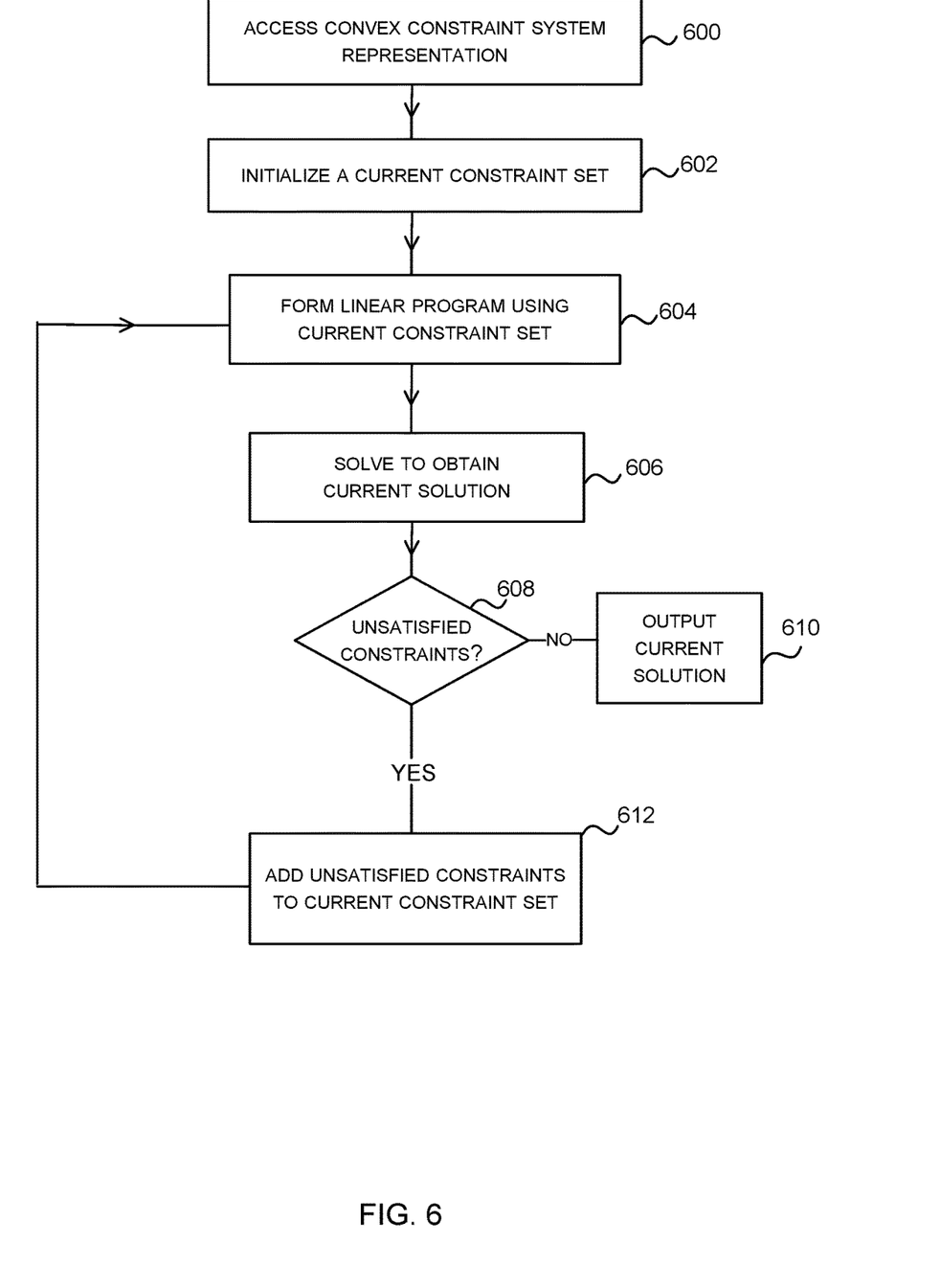
FIG. 6 is a flow diagram of an example iterative constraint refinement process.

More detail about the iterative constraint refinement process is now given with respect to FIG. 6. The constraint system (which has undergone convex strengthening) is accessed 600 and used to initialize 602 a current constraint set. This is done by placing equality statements from the accessed constraint system into a previously empty current constraint set.

A linear program is formed 604 using the current constraint set. Because the current constraint set comprises fewer than the total number of constraints in the accessed constraint system, the linear program is of reduced complexity as compared with a linear program formed from the whole constraint system.

The linear program is solved 606 using any conventional linear program solver (such as are currently commercially available) so that a solution is found, referred to as the current solution. The current solution is then checked against the accessed constraint system, to find constraints which are violated by the current solution. If unsatisfied (violated) constraints are found at check 608 then a plurality of the unsatisfied constraints (such as a thousand unsatisfied constraints) are added to the current constraint set at operation 612. The process then repeats from step 604 to form a linear program and solve that.

It is found that after around two to three iterations there are few or no unsatisfied constraints at check 608 and the current solution is output 610 as a final solution.

Figure 7:
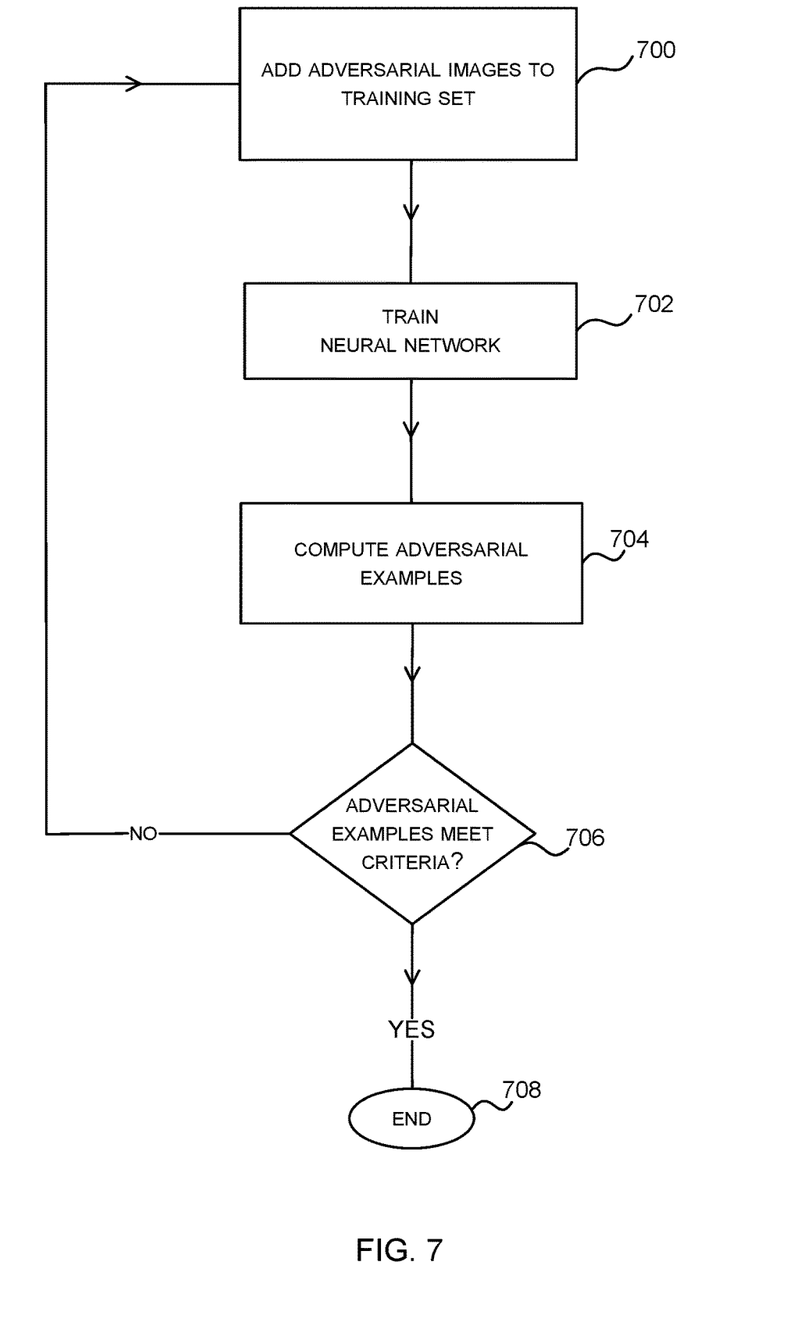
FIG. 7 is a flow diagram of an example fine tuning process.

FIG. 7 is a flow diagram of a method of fine tuning the neural network image classifier using the adversarial examples computed by the adversarial example generator. The process of FIG. 7 is one example only and it is adaptable in various ways such as by dividing the training set into batches and using different batches for different iterations, or in other ways.

The training engine adds 700 the adversarial images to the training set. It trains the neural network image classifier using the training set which includes the adversarial examples. For example, the training is done in a class-balanced manner with a reduced training rate. The training engine then proceeds to compute 704 another round of adversarial examples as described with respect to FIG. 5 and FIG. 6. A check is made to see if the adversarial examples meet criteria. For example, if the number of adversarial examples has fallen below a threshold amount, if the distance of the adversarial examples is on average further than a specified amount from the training examples, or other criteria. If the criteria are met the neural network is determined to be robust and the process ends 708. If the criteria are not met the process of fine tuning repeats as indicated in FIG. 7.

In an example a neural network image classifier was fine-tuned, using either one or two rounds of fine tuning, and using adversarial examples generated as described herein, or using an alternative approach whereby a search for adversarial examples looks along a gradient of a loss function, where the loss function expresses a difference between ground truth class labels and empirical class labels generated by the neural network image classifier over the input space. The resulting fine-tuned neural network image classifier was tested for accuracy. This was done by presenting it with ground truth labeled images and checking the percentage of those images which were correctly labeled by the fine-tuned neural network image classifier. The results are given in the table below and it can be seen that the robust neural network image classifier generated using the methods described herein performs with higher accuracy than the robust neural network image classifier generated using the alternative approach. Also, the robust neural network image classifier generated using the methods described herein is able to generalize to the adversarial examples generated using the alternative approach whilst the converse is not true.

| Type of fine-tuning | Accuracy when presented with all adversarial examples computed using the alternative approach | Accuracy when presented with all adversarial examples computing using the approach described herein |
|---|---|---|
| None | 28.0 | 0.0 |
| One round, using adversarial examples generated using alternative approach based on loss function | 59.1 | 3.51 |
| Two rounds using adversarial examples generated using alternative approach based on loss function | 63.1 | 3.5 |
| One round using the approach described herein | 75.0 | 67.4 |
| One round using the approach described herein | 74.2 | 71.7 |

An empirical test to compare the number of adversarial examples generated by the methods described herein, as compared with the number of adversarial examples generated by the alternative approach mentioned above was also done. It was found that the methods described herein generate more adversarial examples when measured as a percentage of the training data set.

More detail about how to compute the constraint system is now given for different types of neural network layer.

In the case of a rectified linear unit layer an example neural network image classifier such as that of FIG. 4 is considered consisting of a fully connected layer W 402, a rectified linear unit (ReLU) layer R 404 followed by another fully connected layer U 406 before a final softmax layer 408. The inputs to the rectified linear unit R are given by y=Wx, that is, they are some linear expressions of the input vector x. The output of each rectified linear unit, denoted $z_i$, will be either 0, if $y_i$ is less than or equal to 0, or equal to $y_i$ if $y_i$ is greater than or equal to 0. Every concrete training point that is evaluated either satisfies one part of the ReLU disjunction, or the other. This disjunct, being a linear inequality, corresponds to a hyperplane that finds the training point on one side or the other. Accumulating hyperplanes arising from possible linear constraints for this specific training point carves out a convex polyhedron, specific to this point, and one that is used to efficiently optimize a linear objective, in examples herein where there is a neural network with an ReLU layer.

In order to explain how to compute the constraint system some notation is first explained. A constraint system C comprises linear relations (equalities and inequalities), conjunctions (represented using the symbol $\Lambda$) and disjunctions (represented using the symbol v). The neural network has k layers and the symbol $x^{(i)}$ denotes the output vector of layer i of the network. The input to the first layer of the network is $x^{(0)} = x = x_* + r$ where r is a variable to be found (the distance of the adversarial example from the training image in the input space, measured using any distance metric such as an $L_\infty$ norm) and $x_*$ is the training image. In some examples, the variable r is constrained to be within a user configurable distance ε of the training example, where ε is a maximum distance whereby the adversarial example is perceived as being the same as the training example by a human. The parameter ε is found from empirical data. However, it is not essential to use the parameter ε.

The constraint system comprises the following constraint which expresses that the input x that is being searched for is an adversarial example:

The output of the network $x^{(k)}$ satisfies $x_l^{(k)} \geq x_{l'}^{(k)}$ for every $l' \neq l$ which is expressed in words as the output of the final network layer at the node associated with label l (where l is not the label assigned to the training example or ground truth—that is, since x is an adversarial example, its label should be different from the one assigned to the training example.)

For each layer $f^i$ of the neural network the constraint system is constructed by encoding the computation of the output vector of the layer i of the network given the output vector of the immediately preceding layer as a constraint $C_i$.

In the case of a fully connected layer, the layer $f^i$ is given by:

$$x^i = f^{(i)}(x^{(i-1)}) = W^{(i)} x^{(i-1)} + b^{(i)},$$

introducing the following linear constraint over variables $x^{(i-1)}$ and $x^i$:

$$C_i \equiv \bigwedge_{j=1}^{n_i} \{x_j^{(i)} = W_j^{(i)} x^{(i-1)} + b_j^{(i)}\}$$

where $W_j^{(i)}$ is the j-th row of $W^{(i)}$. Which is expressed in words as, the constraint system for layer i is equivalent to the conjunction of a plurality of equality statements, one equality statement for each node n of the fully connected layer, where W is a matrix whose entries denote the weights of the nodes of the fully connected layer.

In the case of a rectified linear unit layer, the layer $f^i$ is given by:

$$x_j^{(i)} = \max\{x_j^{(i-1)}, 0\} \text{ for } 1 \leq j \leq n_i.$$

Which is encoded as a disjunction of linear constraints $C_i \equiv \bigwedge_{j=1}^{n_i} C_{ij}$, where $$C_{ij} = (x_j^{(i-1)} < 0 \wedge x_j^{(i)} = 0) \vee (x_j^{(i-1)} \geq 0 \wedge x_j^{(i)} = x_j^{(i-1)})$$

Convolutional layers are linear layers and hence their encoding is as for fully-connected layers. Max-pooling layers are encoded as for rectified linear unit layers with an adjustment so each constraint disjunction corresponds to a position in the pooling filter.

In order to convert the convex strengthened constraint system into a linear program . . . .

Figure 8:
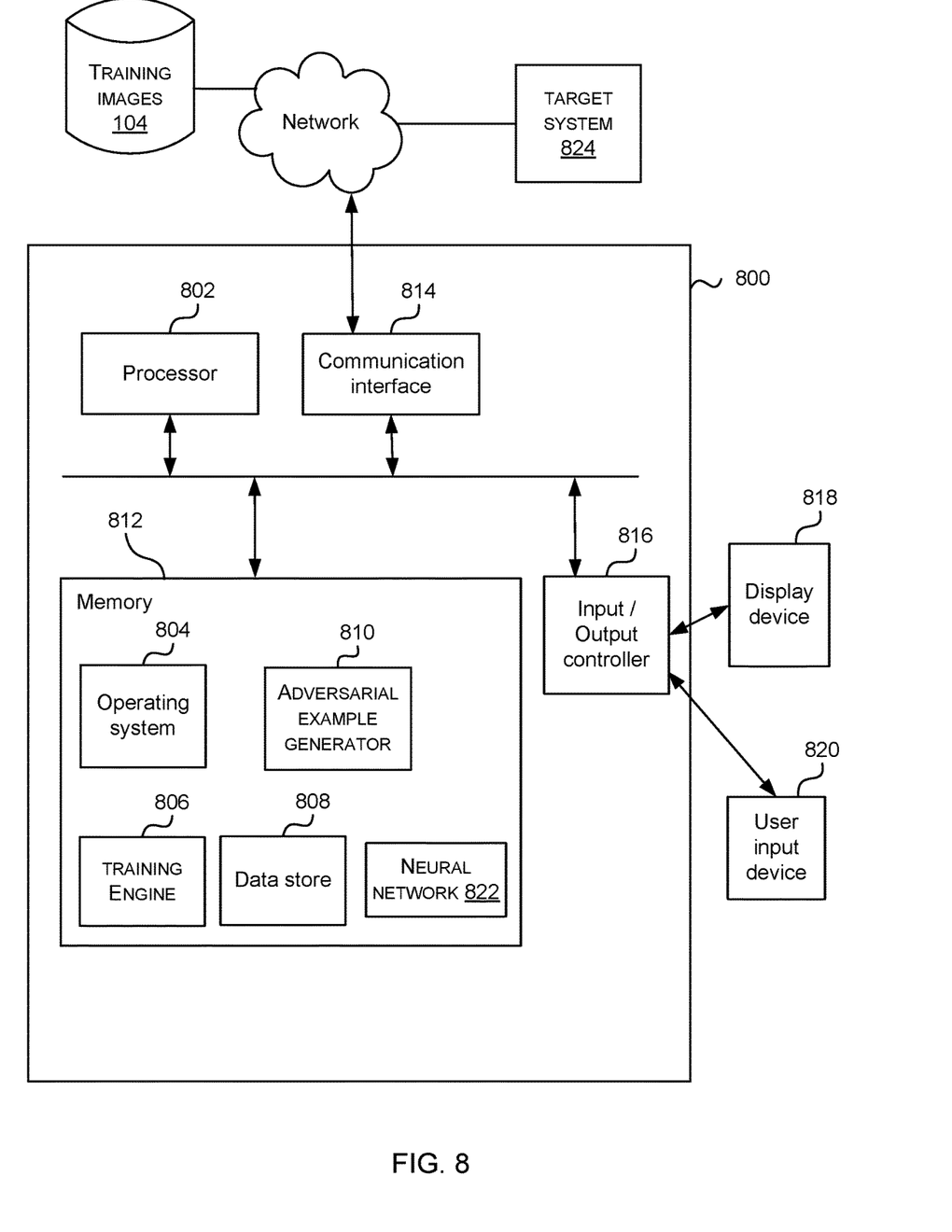
FIG. 8 illustrates an exemplary computing-based device in which embodiments of a training engine are implemented.

FIG. 8 illustrates various components of an exemplary computing-based device 800 which are implemented as any form of a computing and/or electronic device, and in which embodiments of a training engine for improving the robustness of neural network image classifiers to adversarial examples are implemented in some examples.

Computing-based device 800 comprises one or more processors 802 which are microprocessors, controllers or any other suitable type of processors for processing computer executable instructions to control the operation of the device in order to compute adversarial examples and train a neural network image classifier using the adversarial examples. In some examples, for example where a system on a chip architecture is used, the processors 802 include one or more fixed function blocks (also referred to as accelerators) which implement a part of the method of any of FIGS. 5, 6, 7, and or a neural network image classifier 822 in hardware (rather than software or firmware). Platform software comprising an operating system 804 or any other suitable platform software is provided at the computing-based device to enable application software to be executed on the device. The application software comprises an adversarial example generator 810 in some examples. The application software comprises a training engine 806 in some examples, and a neural network 822 image classifier in some examples. A data store 808 at the computing device stores values of parameters used by the training engine 806, images, class labels, uncertainty data associated with class labels generated by the neural network, training data and other data. Once a robust neural network image classifier is formed using the training engine 806 it is sent to a target system 824 via a communications network in some cases.

The computer executable instructions are provided using any computer-readable media that is accessible by computing based device 800. Computer-readable media includes, for example, computer storage media such as memory 812 and communications media. Computer storage media, such as memory 812, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 800 it will be appreciated that the storage is, in some examples, distributed or located remotely and accessed via a network or other communication link (e.g. using communication interface 814).

The computing-based device 800 also comprises an input/output controller 816 arranged to output display information to a display device 818 which may be separate from or integral to the computing-based device 800. The display information may provide a graphical user interface. The input/output controller 816 is also arranged to receive and process input from one or more devices, such as a user input device 820 (e.g. a mouse, keyboard, camera, microphone or other sensor). In some examples the user input device 820 detects voice input, user gestures or other user actions and provides a natural user interface (NUI). This user input may be used to specify locations of training data, specify locations of neural network image classifiers to be made more robust, to display adversarial images and for other purposes. In an embodiment the display device 800 also acts as the user input device 820 if it is a touch sensitive display device. The input/output controller 816 outputs data to devices other than the display device in some examples, e.g. a locally connected printing device.

Any of the input/output controller 816, display device 818 and the user input device 820 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively, or in addition to the other examples described herein, examples include any combination of the following:

A training engine comprising:

a memory arranged to access a neural network image classifier, the neural network image classifier having been trained using a plurality of training images from an input space, the training images being labeled for a plurality of classes;

an adversarial example generator which computes a plurality of adversarial images by, for each adversarial image, searching a region in the input space around one of the training images, the region being one in which the neural network is linear, to find an image which is incorrectly classified into the plurality of classes by the neural network; and a processor which further trains the neural network image classifier using at least the adversarial images.

The training engine described in the paragraph immediately above wherein the adversarial example generator computes an adversarial image as a perturbation of an associated training image which is correctly classified by the neural network, such human perception of the adversarial image and the associated training image is the same.

The training engine described above wherein the adversarial example generator searches the region in the input space by searching a convex polyhedron in the input space.

The training engine described above wherein the adversarial example generator searches for the closest adversarial example in the region to the training image.

The training engine described above wherein the adversarial example generator applies the training image to the neural network and observes a response of the neural network, and computes a constraint system using the observed response, the constraint system approximating the region of the input space.

The training engine described above wherein the adversarial example generator computes a constraint system comprising a plurality of equalities and a plurality of inequalities describing the region of the input space.

The training engine described above wherein the adversarial example generator removes disjunctions from the constraint system.

The training engine described above wherein the adversarial example generator forms a linear program from the constraint system after removal of the disjunctions and solves the linear program using an iterative constraint refinement process.

The training engine described above wherein the adversarial example generator initializes a current constraint set with the plurality of equalities and computes a current solution to a linear program formed from the current constraint set, and adds ones of the inequalities which are unsatisfied by the current solution to the current constrain set, and computes an updated current solution.

The training engine described above wherein the iterative constraint refinement process uses fewer than five iterations.

The training engine described above wherein the adversarial example generator computes the plurality of adversarial images in parallel.

A computer-implemented method comprising:

accessing, from a memory, a neural network image classifier, the neural network image classifier having been trained using a plurality of training images from an input space, the training images being labeled for a plurality of classes;

computing a plurality of adversarial images by, for each adversarial image, searching a region in the input space around one of the training images, the region being one in which the neural network is linear, to find an image which is incorrectly classified into the plurality of classes by the neural network; and further training the neural network image classifier using at least the adversarial images.

The method described above comprising computing an adversarial image as a perturbation of an associated training image which is correctly classified by the neural network, such human perception of the adversarial image and the associated training image is the same.

The method described above comprising searching the region in the input space by solving a linear program comprising a constraint system which approximates the region in the input space.

The method described above comprising searching the region in the input space by searching a convex polyhedron in the input space.

The method described above comprising searching for the closest adversarial example in the region to the training image.

The method described above comprising applying the training image to the neural network and observing a response of the neural network, and computing a constraint system which represents the input space using the observed response.

The method described above comprising removing disjunctions from the constraint system.

The method described above comprising using an iterative constraint refinement process to carry out the searching.

A training engine comprising:
a memory arranged to access a neural network image classifier, the neural network image classifier having been trained using a plurality of training images from an input space, the training images being labeled for a plurality of classes;
an adversarial example generator which computes a plurality of adversarial images by, for each adversarial image, solving a constraint system which approximates a region in the input space around the training image, to find an image which is incorrectly classified into the plurality of classes by the neural network; and
a processor which further trains the neural network image classifier using at least the adversarial images.

An image classification system comprising:
a memory storing a neural network image classifier, the neural network image classifier having been trained using a plurality of training images from an input space, the training images being labeled for a plurality of classes;
an adversarial example generator which computes a plurality of adversarial images by, for each adversarial image, searching a region in the input space around one of the training images, the region being one in which the neural network is linear, to find an image which is incorrectly classified into the plurality of classes by the neural network; and
a processor which further trains the neural network image classifier using at least the adversarial images.

A computer-implemented method of image classification comprising:
storing a neural network image classifier at a memory, the neural network image classifier having been trained using a plurality of training images from an input space, the training images being labeled for a plurality of classes;
computing a plurality of adversarial images by, for each adversarial image, searching a region in the input space around one of the training images, the region being one in which the neural network is linear, to find an image which is incorrectly classified into the plurality of classes by the neural network;
training the neural network image classifier using at least the adversarial images;
receiving an input image to be classified and classifying the input image using the trained neural network image classifier, where the input image has not been used to train the neural network image classifier.

A computing device comprising:
means for accessing, from a memory, a neural network image classifier, the neural network image classifier having been trained using a plurality of training images from an input space, the training images being labeled for a plurality of classes;
means for computing a plurality of adversarial images by, for each adversarial image, searching a region in the input space around one of the training images, the region being one in which the neural network is linear, to find an image which is incorrectly classified into the plurality of classes by the neural network; and
means for further training the neural network image classifier using at least the adversarial images.

An adversarial example generator comprising:
a memory arranged to access a neural network image classifier, the neural network image classifier having been trained using a plurality of training images from an input space, the training images being labeled for a plurality of classes;
a processor which computes a plurality of adversarial images by, for each adversarial image, solving a constraint system which approximates a region in the input space around the training image, to find an image which is incorrectly classified into the plurality of classes by the neural network.

A computer-implemented method comprising:
accessing a neural network image classifier, the neural network image classifier having been trained using a plurality of training images from an input space, the training images being labeled for a plurality of classes;
computing, using a processor, a plurality of adversarial images by, for each adversarial image, solving a constraint system which approximates a region in the input space around the training image, to find an image which is incorrectly classified into the plurality of classes by the neural network.

The examples illustrated and described herein as well as examples not specifically described herein but within the scope of aspects of the disclosure constitute exemplary means for accessing a neural network from memory, computing adversarial examples and training the neural network using the adversarial examples For example, the elements illustrated in FIGS. 1, 2, 8, such as when encoded to perform the operations illustrated in FIGS. 5, 6, 7, constitute exemplary means for accessing a neural network from a memory, computing adversarial examples and training the neural network using the adversarial examples.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system for a neural network image classifier having improved accuracy, the system comprising:
a memory arranged to access a neural network image classifier, the neural network image classifier having been trained using a plurality of training images from an input space, the training images being labeled for a plurality of classes; and
at least one processor that computes a plurality of adversarial images by, for each adversarial image, searching a region in the input space around one of the training images, the region being one in which the neural network is linear, to find an image which is incorrectly classified into the plurality of classes by the neural network,
wherein the at least one processor applies the training image to the neural network and observes a response of the neural network,
wherein the at least one processor computes a constraint system using the observed response, the constraint system approximating the region of the input space, and
wherein the at least one processor further trains the neural network image classifier to have improved accuracy using at least the adversarial images.

2. The system of claim 1, wherein the at least one processor computes an adversarial image as a perturbation of an associated training image which is correctly classified by the neural network, such human perception of the adversarial image and the associated training image is the same.

3. The system of claim 1, wherein the at least one processor searches the region in the input space by searching a convex polyhedron in the input space.

4. The system of claim 1, wherein the at least one processor searches for the closest adversarial example in the region to the training image.

5. The system of claim 1, wherein the at least one processor computes the constraint system comprising a plurality of equalities and a plurality of inequalities describing the region of the input space.

6. The system of claim 5, wherein the at least one processor removes disjunctions from the constraint system.

7. The system of claim 6, wherein the at least one processor forms a linear program from the constraint system after removal of the disjunctions and solves the linear program using an iterative constraint refinement process.

8. The system of claim 7, wherein the at least one processor initializes a current constraint set with the plurality of equalities and computes a current solution to a linear program formed from the current constraint set, and adds ones of the inequalities which are unsatisfied by the current solution to the current constrain set, and computes an updated current solution.

9. The system of claim 7, wherein the iterative constraint refinement process uses fewer than five iterations.

10. The system of claim 1, wherein the at least one processor computes the plurality of adversarial images in parallel.

11. A computer-implemented method comprising:
accessing, from a memory, a neural network image classifier, the neural network image classifier having been trained using a plurality of training images from an input space, the training images being labeled for a plurality of classes;
computing a plurality of adversarial images by, for each adversarial image, searching a region in the input space around one of the training images, the region being one in which the neural network is linear, to find an image which is incorrectly classified into the plurality of classes by the neural network;
applying the training image to the neural network and observing a response of the neural network;
computing a constraint system which represents the input space using the observed response; and
further training the neural network image classifier to have improved accuracy using at least the adversarial images.

12. The method of claim 11, further comprising
computing an adversarial image as a perturbation of an associated training image which is correctly classified by the neural network, such human perception of the adversarial image and the associated training image is the same.

13. The method of claim 11, further comprising:
searching the region in the input space by solving a linear program comprising the constraint system which approximates the region in the input space.

14. The method of claim 11, further comprising:
searching the region in the input space by searching a convex polyhedron in the input space.

15. The method of claim 11, further comprising:
searching for the closest adversarial example in the region to the training image.

16. A system for a neural network image classifier having improved accuracy, the system comprising:
a memory arranged to access the neural network image classifier, the neural network image classifier having been trained using a plurality of training images from an input space, the training images being labeled for a plurality of classes; and
a processor which computes a plurality of adversarial images by, for each adversarial image, searching a region in the input space around the training image, the region being one in which the neural network is linear, to find an image which is incorrectly classified into the plurality of classes by the neural network,
wherein the processor searches the region in the input space by searching a convex polyhedron in the input space, and
wherein the processor further trains the neural network image classifier to have improved accuracy using at least the adversarial images.

17. The system of claim 16, wherein the processor computes the plurality of adversarial images in parallel.

18. A computer-readable storage media storing instructions, when executed by at least one processor, performs a method comprising:
accessing a neural network image classifier, the neural network image classifier having been trained using a plurality of training images from an input space, the training images being labeled for a plurality of classes;
computing, using a processor, a plurality of adversarial images by, for each adversarial image, searching a region in the input space around the training image, the region being one in which the neural network is linear, to find an image which is incorrectly classified into the plurality of classes by the neural network;
applying the training image to the neural network and observing a response of the neural network;
computing a constraint system which represents the input space using the observed response; and
further training the neural network image classifier to have improved accuracy using at least the adversarial images.

19. The computer-readable storage media of claim 18, wherein the method further comprises:
computing the constraint system comprising a plurality of equalities and a plurality of inequalities describing the region of the input space.

20. A computer-implemented method comprising:
accessing, from a memory, a neural network image classifier, the neural network image classifier having been trained using a plurality of training images from an input space, the training images being labeled for a plurality of classes;
computing a plurality of adversarial images by, for each adversarial image, searching a region in the input space around the training image, the region being one in which the neural network is linear, to find an image which is incorrectly classified into the plurality of classes by the neural network;
searching the region in the input space by searching a convex polyhedron in the input space; and
further training the neural network image classifier to have improved accuracy using at least the adversarial images.

* * * * *